(12) United States Patent
Steinke et al.

(10) Patent No.: US 8,603,377 B2
(45) Date of Patent: Dec. 10, 2013

(54) METHOD FOR RETREADING A HEAVY DUTY TIRE WITH A POLYURETHANE TREAD

(75) Inventors: Richard A. Steinke, Boulder City, NV (US); Gary N. Benninger, Henderson, NV (US); James G. Moore, Boulder City, NV (US)

(73) Assignee: Amerityre, Boulder City, NV (US)

( * ) Notice: Subject to any disclaimer, the term of this patent is extended or adjusted under 35 U.S.C. 154(b) by 0 days.

(21) Appl. No.: 13/462,605

(22) Filed: May 2, 2012

(65) Prior Publication Data

US 2013/0112333 A1    May 9, 2013

Related U.S. Application Data

(62) Division of application No. 12/583,379, filed on Aug. 20, 2009, now Pat. No. 8,206,141.

(51) Int. Cl.
*B29D 30/54* (2006.01)

(52) U.S. Cl.
USPC ............ 264/36.14; 156/64; 156/96; 156/245; 264/311

(58) Field of Classification Search
USPC ............ 156/64, 96, 98, 245, 281; 264/36.14, 264/311
See application file for complete search history.

(56) References Cited

U.S. PATENT DOCUMENTS

| | | | | |
|---|---|---|---|---|
| 2,873,790 A * | 2/1959 | Cadwell et al. | ............... | 156/125 |
| 3,200,180 A * | 8/1965 | Russ et al. | ................... | 264/311 |
| 3,645,655 A * | 2/1972 | Beneze | ........................ | 264/311 |
| 3,695,808 A * | 10/1972 | Beneze | ........................ | 264/311 |
| 4,064,215 A * | 12/1977 | Halada et al. | ................. | 264/311 |
| 4,158,378 A * | 6/1979 | Pearson et al. | .................. | 156/97 |
| 4,240,852 A * | 12/1980 | Gomberg et al. | ............... | 156/96 |
| 4,490,197 A * | 12/1984 | Bajer | .............................. | 156/96 |
| 4,704,176 A * | 11/1987 | Botzman | ........................ | 156/96 |
| 5,906,836 A * | 5/1999 | Panaroni et al. | ............... | 425/435 |
| 6,872,271 B2 * | 3/2005 | Nowotarski | ..................... | 156/96 |
| 6,974,519 B2 * | 12/2005 | Steinke et al. | ................. | 264/311 |
| 7,399,172 B2 * | 7/2008 | Steinke et al. | ................. | 425/35 |

* cited by examiner

*Primary Examiner* — James Mackey
(74) *Attorney, Agent, or Firm* — M. Reid Russell

(57) ABSTRACT

A process and method for retreading a heavy duty tire with a polyurethane tread where, after a tire carcass is inspected, cleaned and the worn tire tread is removed, the tire carcass receives a tube fitted therein and is installed in a mold cavity, between top and bottom mold rings. The mold rings each include spaced segments that inter-digitate and will form equal spaced tread voids in a finished recapped tire. The bottom mold ring inner edge top includes a continuous sealing lug, and the top ring is open to pass a flow of polyurethane materials, that is received off of a lower edge of a cone shaped spreader positioned onto the tire carcass top side wall and slides, as a sheet, into the mold, filling the mold cavity from bottom to top, forcing air from the mold ahead of the fill and forming the recapped tire tread.

8 Claims, 10 Drawing Sheets

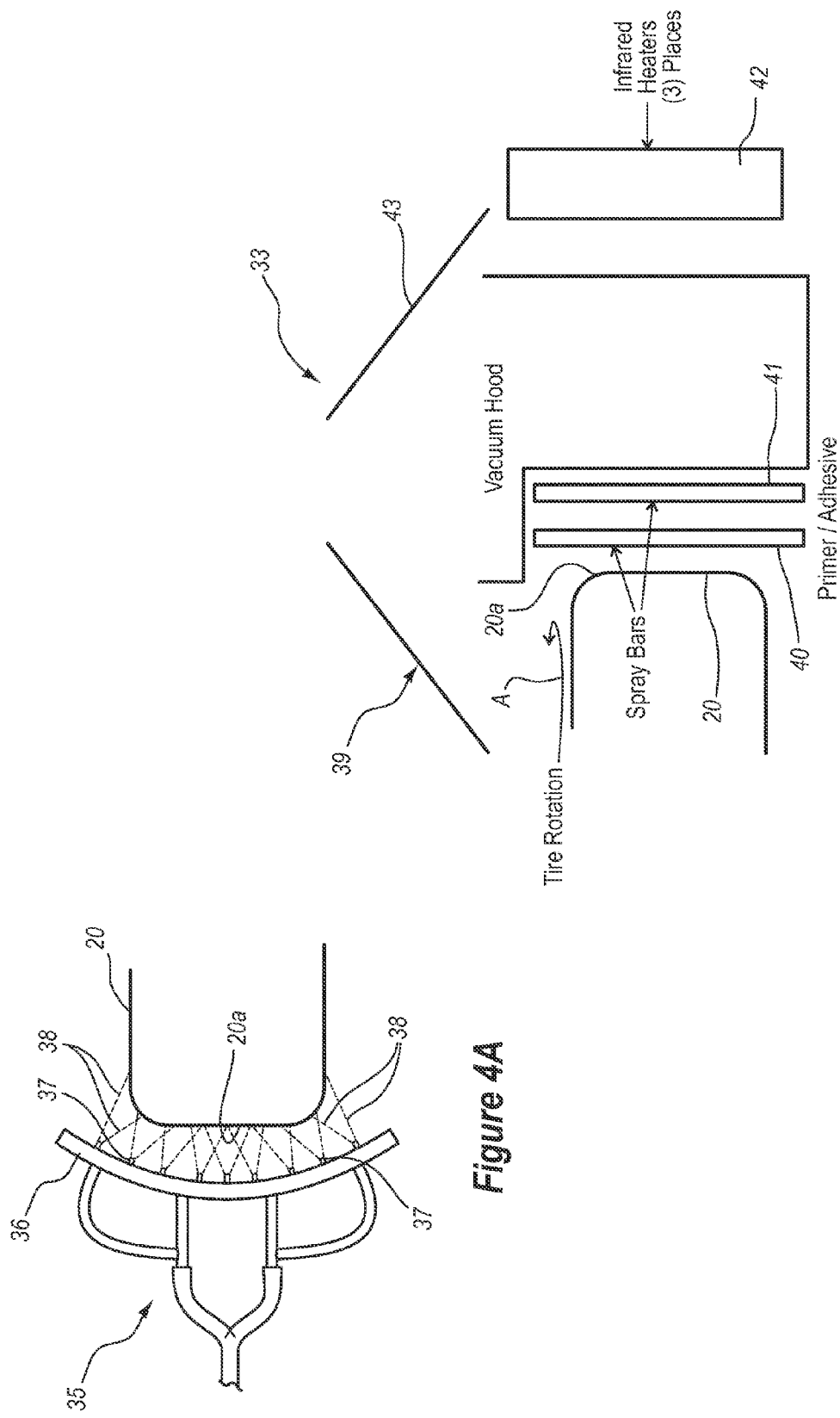

METHOD FOR RETREADING A HEAVY DUTY TIRE WITH A POLYURETHANE TREAD

This application is a Divisional Application of application Ser. No 12/583,379, for METHOD AND APPARATUS FOR RETREADING A HEAVY DUTY TIRE WITH A POLYURETHANE TREAD, filed Aug. 20,2009, that has received a U.S. Pat. No. 8,206,141

BACKGROUND OF INVENTION

1. Field of The Invention

This invention relates to automated a casting method with apparatus for use therewith for retreading even very large tires, such as earth mover tires, with a polyurethane tread.

2. Prior Art

The present invention is in a new and unique process and method for preparation of earth mover type tires for recapping, and recapping the tire with a polyurethane material. The recapping of the prepared tire takes place in a molding process, producing a finished recapped tire that is at least as cut resistant, and will have essential the same or better tire life, under like use conditions, as a new conventional rubber earth mover tire.

Heretofore, recapping of large, to very large, tires, such as an earth mover tire, have utilized rubber recapping techniques that have been difficult to practice, are labor intensive, and have not produced a tire capable of supporting heavy loads over rough terrain. Also, the quality and life expectancy such recapped heavy duty tires have varied greatly.

In practice, earlier tire retreading practices have involved cold rolling, adhesive bonding and application of pre-cured rubber. In a practice of such processes, new treads or tread sections are applied as with an adhesive onto a tire wherefrom the old tread has ground off, or roughened, and the tire and applied tread are heated to provide for a vulcanization of the tread to the tire. Such processes have not always provided a stable bonding of the applied tread material to the tire, and have often failed when subjected to heat, as a tire under load produces, causing a separation of the tire tread from tire crown or top surface.

Like earlier methods, the present invention includes the steps of inspecting a tire carcass to insure that it is suitable for retreading, and then grinding off the old tread to provide a specific tire profile. After grinding, the carcass is rechecked, particularly the tire ply's, belts and beads, to insure that the tire carcass is suitable for retreading. The carcass is then cleaned with an appropriate solvent entrained with air in a pressure spray.

Shortly after drying, the carcass is treated with a primer, preferably a primer known as Chemlock® a product manufactured and sold by Rohm and Hass Company, of Philadelphia, Pa. that provides for surface conditioning of a rubber surface, and is then allowed to dry for approximately fifteen minutes before an adhesive, preferably a Chemlock® also manufactured sold by Rohm and Hass Company, of Philadelphia, PA that provides for bonding between polyurethane and rubber surfaces, adhesive is applied. The combination of the selected primer and adhesive provides for conditioning the carcass prepared tread area surface to securely and permanently bond to the tread of polyurethane material cast thereto. After application of the preferred primer and adhesive, the carcass is placed in an oven for approximately two hours at a temperature of approximately two hundred twenty five (225) degrees F. In practice, it is important to complete the process steps in a short period of time from the carcass grinding to where the carcass is coated with the preferred Chemlock® primer and Chemlock® adhesive and is ready to be heated.

Unique to the invention, after the required tire carcass heating, an inflatable tube is fitted into the carcass and is inflated to approximately nine (9) PSI, and the carcass is positioned in a mold that is heated to approximately one hundred eighty (180) degrees F. The mold, for practicing the process of the invention, provides for passing polyurethane materials into the mold cavity containing the carcass, off of an edge of a cone that directs an even distribution of the materials along the mold hub area and across the mold cavity to fill the mold cavity from bottom to top, forming the carcass tread, providing for pushing air from the mold cavity ahead of the pour. During the pour, the mold is rotated at a low RPM, to uniformly fill the mold and to provide for a homogeneous distribution of the materials in the mold cavity forming the carcass tread area. After approximately a fifteen (15) minute cure, the now retreaded tire carcass is removed from the mold and is post cured at a temperature of approximately one hundred seventy five (175) degrees F., for approximately twelve hours.

Prior to the present invention, retreading of a tire carcasses, particularly a large tire carcass with polyurethane materials, have not been successful, due to a failure to properly prepare and pour the selected polyurethane constituents so as to achieve a tread without voids or air pockets therein as does the practice of the method of the invention, and in a single molding operation

SUMMARY OF THE INVENTION

It is a principal object of the present invention to provide a process and method for recapping a tire carcass, even a very large tire carcass, with a polyurethane tread or crown.

Another object of the present invention is to provide a process and method for reliably casting a polyurethane tread onto a prepared tire carcass such that the retread will not separate from the tire under load and at high heat.

Another object of the present invention is to provide a process and method for recapping a large tire carcass that includes a selection of a preferred primer and adhesive that, after a short drying period, will react during the carcass preheating and molding to provide a molecular bond between the carcass ground tread area and a polyurethane material that is passed into a mold containing the carcass.

Another object of the present invention is to provide a process and method for filling a mold cavity containing even a large tire carcass for recapping that tire carcass with a polyurethane material in a pour of the selected polyurethane materials that travels from a lower edge of a cone that is slowly turning, such that the pour will pass across the tire carcass tread area, filling the mold cavity from the bottom to top, forcing air from the mold cavity ahead of the pour, and filling the mold as the tire carcass tread.

Still another object of the present invention is to provide a process and method that includes a step that is practiced, prior to installation of a tire carcass into the mold, where the carcass receives a tube fitted therein that is inflated to approximately nine (9) PSI to expand the carcass side walls into sealing engagement with the mold sides, and where the mold includes segments that extend, at spaced intervals, into the mold that form spaced tread lugs around the tire recap tread.

Still another object of the present invention is to provide a process and method for retreading a large tire carcass that utilizes a mold that is easily disassembled after completion of the pour of polyurethane materials and curing, allowing for a quick release of the recapped carcass from the mold, that is then moved to a post curing room maintained at a temperature of approximately one hundred seventy five (175) degrees F. for approximately twelve hours, completing the tire recapping process.

The present invention is in a process and method for retreading a tire carcass that has been inspected and the old tread ground off to where it is suitable to receive a polyurethane tread bonded thereto. Which grinding preferably involves axially mounting the carcass in a vertical attitude and turning it under a rasp head so as to uniformly grind off the top area of the carcass tread without exposing the carcass belt or belts and plies. The carcass tread area and side walls are then thoroughly cleaned with a solvent spray and are treated with a primer that is compatible with a bonding adhesive, and a preferred primer is a Chemlok® that is suitable for use with a Chemlok® adhesive. The primer coated carcass is allowed to dry for approximately fifteen (15) minutes. After drying, the carcass tread area and partially down the tire carcass side walls, are treated with Chemlok,® adhesive, and, after the carcass has been heated at approximately two hundred twenty five (225) degrees F. for approximately two (2) hours, the tire carcass will have been conditioned to receive, adhere and permanently bond to, a polyurethane material introduced there in a molding process.

Prior to its placement in a mold, the prepared tire carcass receives a bladder inserted therein that, after installation in the mold, is pressurized to approximately nine (9) PSI. Prior to receipt of the tire carcass, the mold receives a ring mounting lower segments fitted therein that form one tire side of spaced tire tread lugs, and, after the tire carcass is fitted into the mold, a lesser width of ring mounting upper segments that form the other tire side and spaced tire tread lugs, is fitted into the mold, above the tire carcass, with the upper and lower segments equally spaced apart from one another and intra digitate. The tire carcass, when expanded by a pressurization of the tube, will engage a circular lug formed on the top inner edge of the lower ring, and a lip edge of a spreader cone lowered into position onto the tire carcass side wall, forming a mold cavity that is the tire carcass tread area, leaving open only a gap between the upper ring center edge and a mold hub, below the spreader cone end, that a pour of polyurethane materials is passed through.

In operation, the mold is maintained a temperature of approximately one hundred eighty (180) degrees F. and, at that temperature, receives a high volume flow of the selected mixed polyurethane materials that are passed out of a pouring head to slide down the spreader cone surface and across its lower edge into the mold cavity. Which spreader cone and mold are rotated slowly, spreading the polyurethane material flow over the sloped spreader cone surface and gravity feed across the spreader cone edge. Thereby, the polyurethane material flows as a continuous sheet across the spreader cone edge and across the tire carcass tread area, filling the mold cavity from bottom to top, forcing air ahead of and out of the mold cavity. An air free, homogeneous mixture of polyurethane materials thereby fills the mold cavity. The polyurethane materials are thereby evenly distributed in and fill the mold cavity above the carcass thread and partially down the carcass sides.

After curing for approximately fifteen (15) minutes the mold is opened and the tire carcass with polyurethane tread secured thereto, is removed and is further cured at a temperature one hundred seventy five (175) degrees F. for approximately twelve (12) hours, completing the carcass retreading process.

DESCRIPTION OF THE DRAWINGS

The invention may take physical form in certain parts and arrangement of parts, used to practice the steps utilizing the apparatus of the invention and preferred embodiments of which will be described in detail in this specification and illustrated in the accompanying drawings which form a part hereof:

FIG. 4, shows spray bars for applying an adhesive primer and, after drying, an adhesive with the steps performed under a hood for venting fumes and encouraging drying, and, after which tire carcass drying, the tire carcass passes into an oven contain infrared heaters, wherefrom the tire carcass travels to the end of a moving chain;

FIG. 4A shows a side elevation view of a section of a spraying arrangement for directing sprays of solvent entrained with air to thoroughly clean the tire casing tread area and partially down the tire carcass side walls before application of the primer and adhesive;

DETAILED DESCRIPTION

Figure 1:
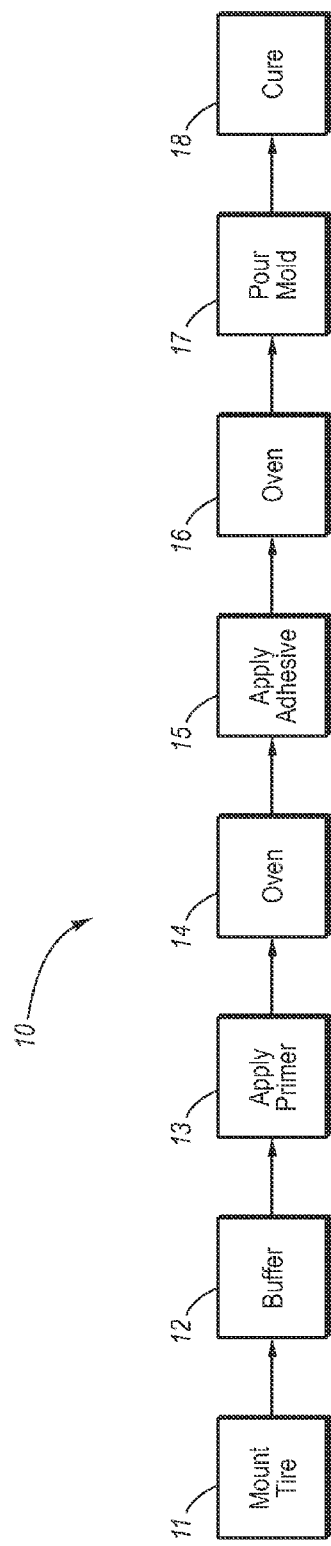
FIG. 1 is a block flow schematic showing the steps of the invention that are performed utilizing apparatus for retreading a transport tire carcass with a polyurethane tread.
Figure 7:
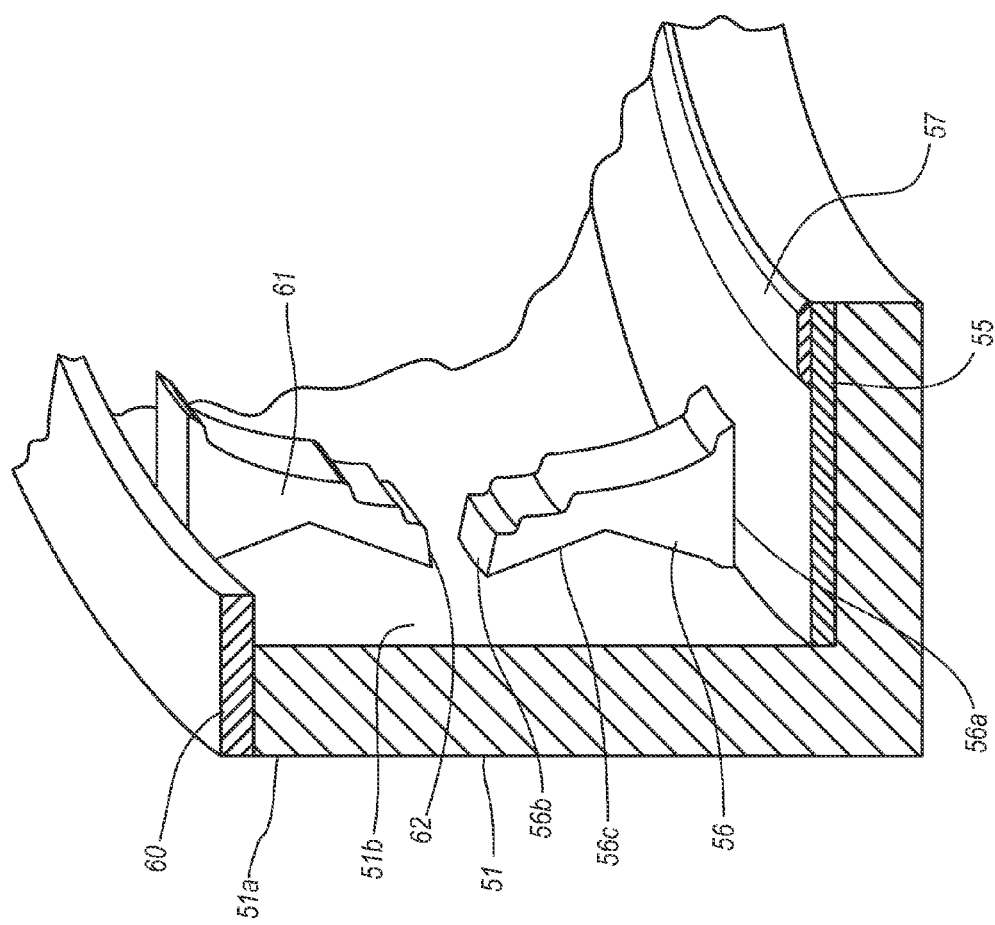
FIG. 7 is a sectional view taken within the line 7-7 of FIG. 6, without the tire carcass, showing a pair of upper and lower spaced segments that have ends that are separated from one another at a longitudinal section of the tire carcass tread area.
Figure 8:
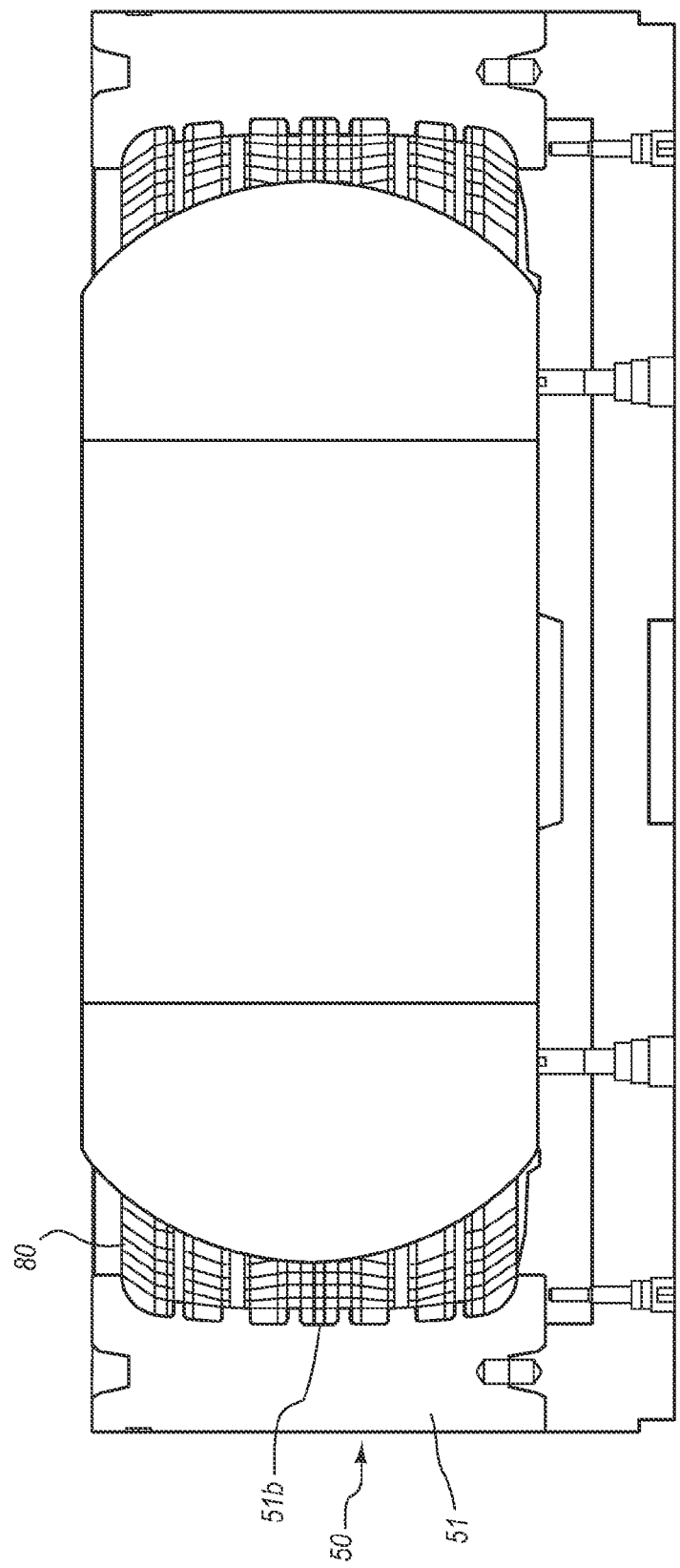
FIG. 8 is a sectional view of mold containing the tire carcass that has been retreaded with a polyurethane material tread after removal of the spreader cone.
Figure 9:
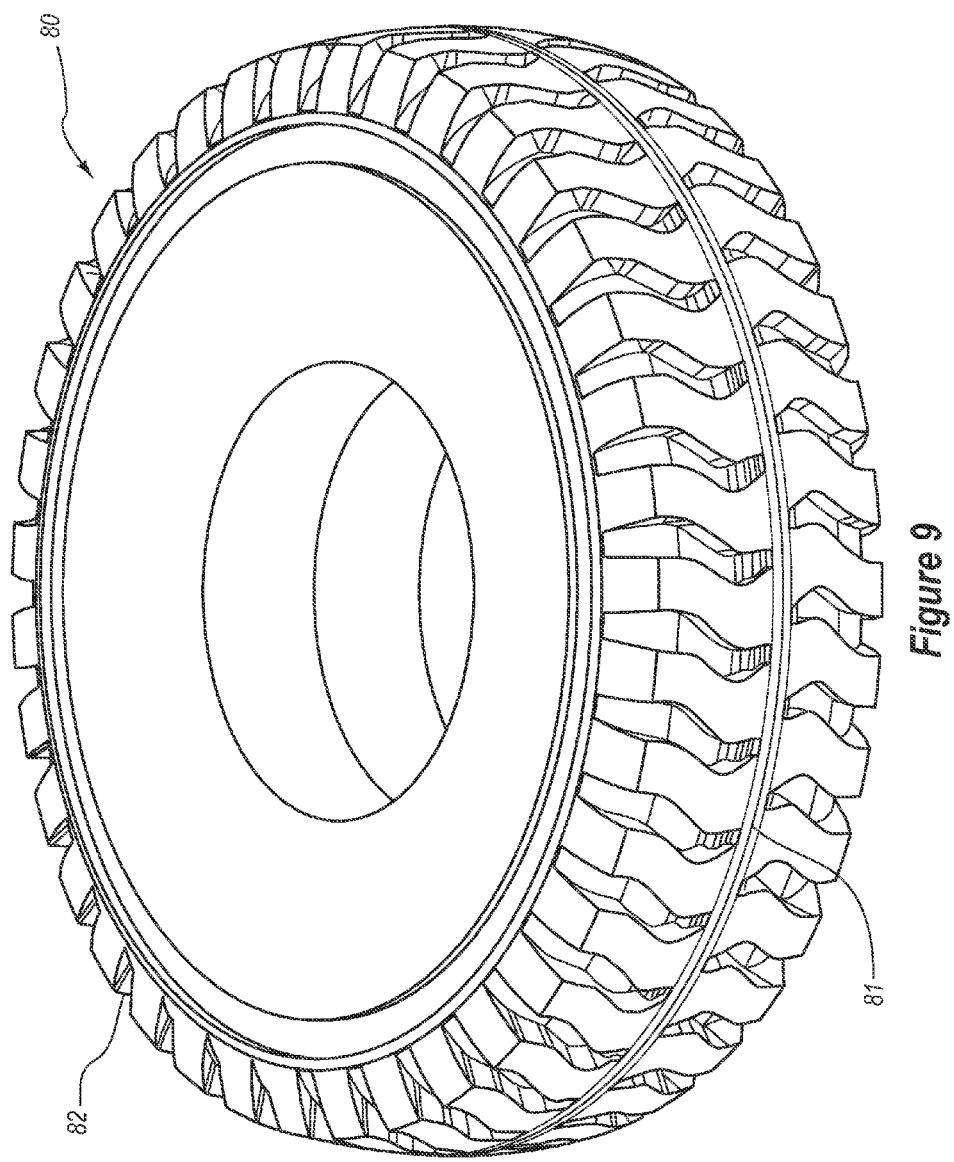
FIG. 9 is a horizontal elevation view of the recapped tire carcass after its removal from the mold.

FIG. 1 shows s block flow schematic 10 that illustrates the steps of the process and method of the invention for recapping a tire, even a large earth mover type tire, with a polyurethane tread FIGS. 2 through 8 illustrate preferred apparatus for practicing the method of the invention, and FIG. 9 shows a large tire that has been recapped utilizing the method and preferred apparatus of the invention. Shown in FIG. 1, the steps of the method of the invention include; a preliminary inspection of the tire that includes, but is not limited to, checking for cuts in the carcass and damage to the tire plies and/or belts; with block 11 calling for mounting the tire carcass to turn in a tire grinding machine, for buffing off the tire carcass tread area, as illustrated by block 12. The tire carcass is then reinspected to insure that the grinding step has not exposed the carcass sections of the belt or plies, or cuts into the belt or plies, as could weaken the tire carcass load bearing capability. Following which tire carcass inspection, after the step of grinding the tire carcass tread area, the carcass is initially thoroughly cleaned with a cleaner spray and is then re-cleaned with a solvent spray. The tire casing is treated with a primer, preferably with a Chemlok® primer, shown at block 13, that is applied across the tire carcass ground tread area and down the tire casing sides to above the mid-line, and that primer is allowed to dry in an oven, illustrated at block 14, or can be air dried for approximately fifteen minutes. The tire carcass tread area and partially down the casing sides are then treated with Chemlok® adhesive, shown in block 15, and the primer and adhesive are then cured in an oven, illustrated at block 16, at a heat of approximately two hundred twenty five (225) degrees F., for approximately two (2) hours, for conditioning the carcass tread area to enable it to permanently bond to a polyurethane tread as is applied in the molding process. Which Chemlok® primer and adhesive are selected for their compatible with the material of the tire casing and the selected polyurethane molding material, whereby, in a practice of the process and method of the invention, the carcass is conditioned to permanently bond to the selected polyurethane materials applied thereto in the molding process. In practice, it has been found that best results are provided if the above steps, up to the application of the Chemlok® adhesive, are completed within a short period of time after the tire carcass thread area is buffed, not to exceed twenty (20) days.

After drying the Chemlok® adhesive for approximately two (2) hours at approximately two hundred twenty five (225) degrees F., the tire casing is positioned in a mold and a tube or bladder is inserted into the tire casing that is pressurized to approximately nine (9) PSI. As set out in detail below, the tube or bladder pressurization causes the tire casing sides to expand into sealing engagement with a ring lug formed around an inner edge of a lower ring that also mounts segments that form the retread grooves that is installed in the mold prior to its receipt of the tire carcass, with the tire casing side wall contact with the ring lug forming a seal, providing a cavity between the tire casing tread area and partially down the carcass lower side and the mold interior. Which cavity is contained by engagement of a lower edge of a spreader cone to the tire carcass top side wall, that leaves an opening around a cavity top of the mold that a pour of the selected polyurethane materials passes through, shown at block 17, and as set out and discussed in detail below, illustrating preferred apparatus of the invention.

During which pour of polyurethane materials, the mold is maintained at a temperature of approximately one hundred eighty (180) degrees F., and the pour is a high volume flow of polyurethane materials that is directed onto, to slide down an outer sloping surface of a spreader cone that is turned slowly, with the polyurethane materials falling off of a lower spreader cone edge that is maintained in sealing engagement with a top side of the tire carcass. Which spreader cone is an inverted truncated cone having a slope that is selected to encourage the polyurethane material flow without introducing a rolling action or material separation as could entrain air in the material. The polyurethane material is to flow as a sheet across the cone edge flow across the tire carcass tread area, filling the mold cavity from the bottom up and spreading across the tire carcass tread area so as to force air out from the cavity ahead of the pour as the cavity is filled. In practice, the spreader cone is supported on the tire carcass top or upper side, with the other or bottom tire carcass side engaging the lug seal at the lower ring edge. So arranged, the spreader cone edge and lower ring lug seal form the ends of the mold cavity, stopping the flow of polyurethane materials to form the ends of the tire carcass recap. In practice, the mold is rotated at low a RPM to evenly distribute and fill the mold cavity. After the mold cavity is filled and, after curing for approximately fifteen (15) minutes, as illustrated at block 18, the tire carcass will have bonded to a polyurethane tread formed around its tread area and partially down the casing sides as a uniform homogeneous tread. Whereafter, the now re-capped tire is removed and further cured at a temperature of one hundred seventy five (175) degrees F. for approximately twelve (12) hours, completing the tire carcass retreading process. Additionally, it should be understood, and as discussed herein below with respect to the apparatus as is preferred for practicing the process and method of the invention, the polyurethane materials are passed from a dispensing nozzle that is fixed in place, and the mold and spreader cone are rotated together. It should, however, be understood that the spreader cone and mold can be fixed in place, and the dispensing nozzle can be orbited above the spreader cone, within the scope of this disclosure.

Figure 2:
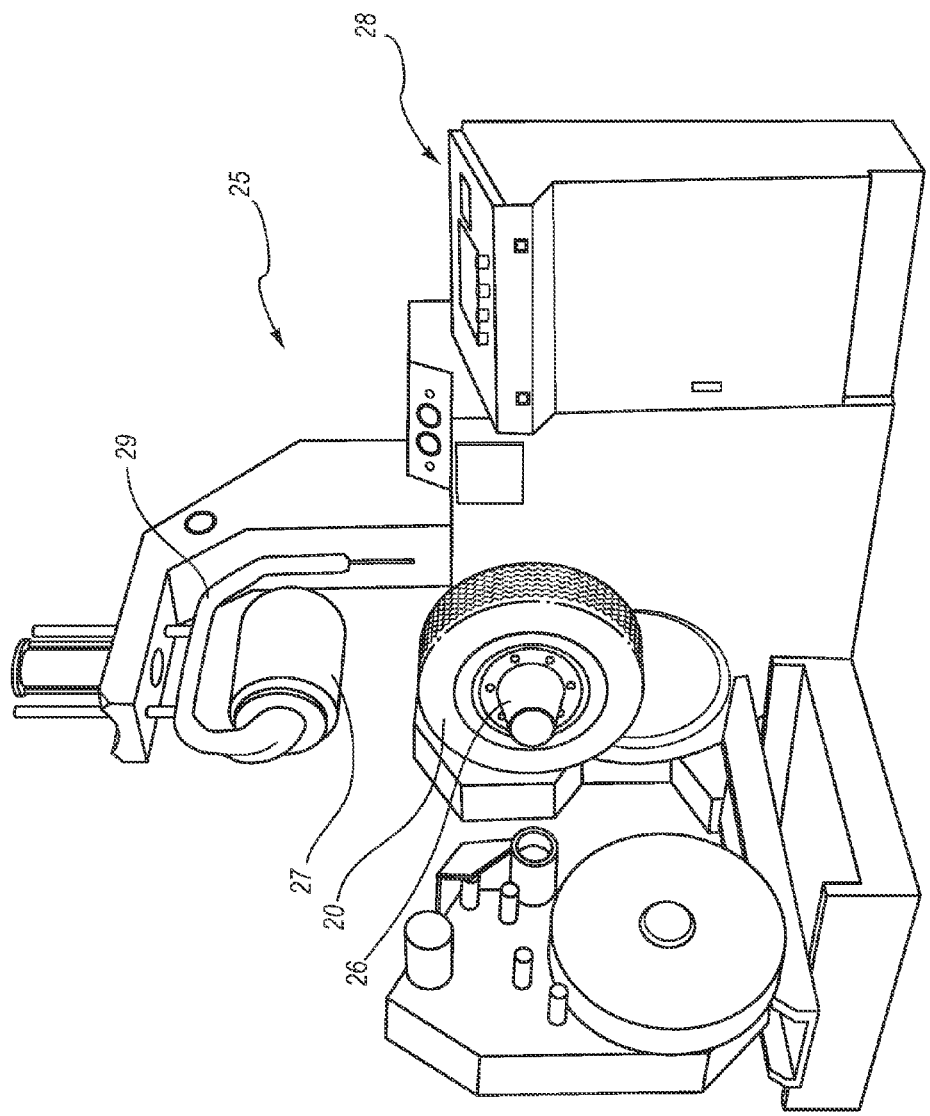
FIG. 2 shows a perspective view taken from the side of a tire carcass tread grinding machine, showing a transport tire mounted therein, illustrating a preferred machine for carrying out the tire grinding step of the practice of the method of the invention, as illustrated in the block flow schematic of FIG. 1.

Preferred apparatus for performing the steps of the method of the invention, as illustrated in FIG. 1, are shown in FIGS. 2 through 8, with a finished recapped tire 80 shown in FIG. 9. In a practice of the first step illustrated in block 11 of FIG. 1, the tire carcass is preliminarily cleaned and inspected for excessive wear or damage as could preclude its suitability for recapping, and, providing the tire carcass passes this initial inspection, it is mounted onto a hub mount 26 as shown in FIG. 2. The mounted tire casing is then moved by a tire lifter of a buffing and tread stripping machine 25 for practicing the step illustrated in block 12 of FIG. 1, for buffing off the prescribed depth of the original tire carcass tread. The tread stripping machine 25 shown in FIG. 2, is preferred, and shows the tire carcass 20 mounted to hub mount 26 and is vertically positioned in the buffing and tread stripping machine 26, below a rasp head 27. Vertical movement of the rasp head 27 is controlled through a control panel 28 that controls operation of a movable mount 29. In practice, the rasp head 27 is capable of forward and reverse turning for grinding off the tire carcass tread to just above a tire belt, preparing the tire carcass 20 for retreading with a polyurethane tread. In practice, a buffing and tread stripper machine, is preferably an MT 2600 As Matic, that is manufactured and sold by CIMA IMPLIANTI S.p.a. that has been used successfully as the buffing and tread stripping machine 25 of the invention.

After grinding off the tire casing tread, the tire carcass is reexamined to insure that it is structurally appropriate for recapping and that it is free from cuts as would potentially limit its service life. Thereafter, the tire carcass 20 is pivoted from the vertical to lay horizontal on a carriage or trolley 32 that is mounted to be moved on a continuous moving chain 31 of a tire carcass preparation a molding plant 30, as shown in FIG. 3, wherein the steps, set on in FIG. 1 and discussed above, are practiced.

Figure 3:
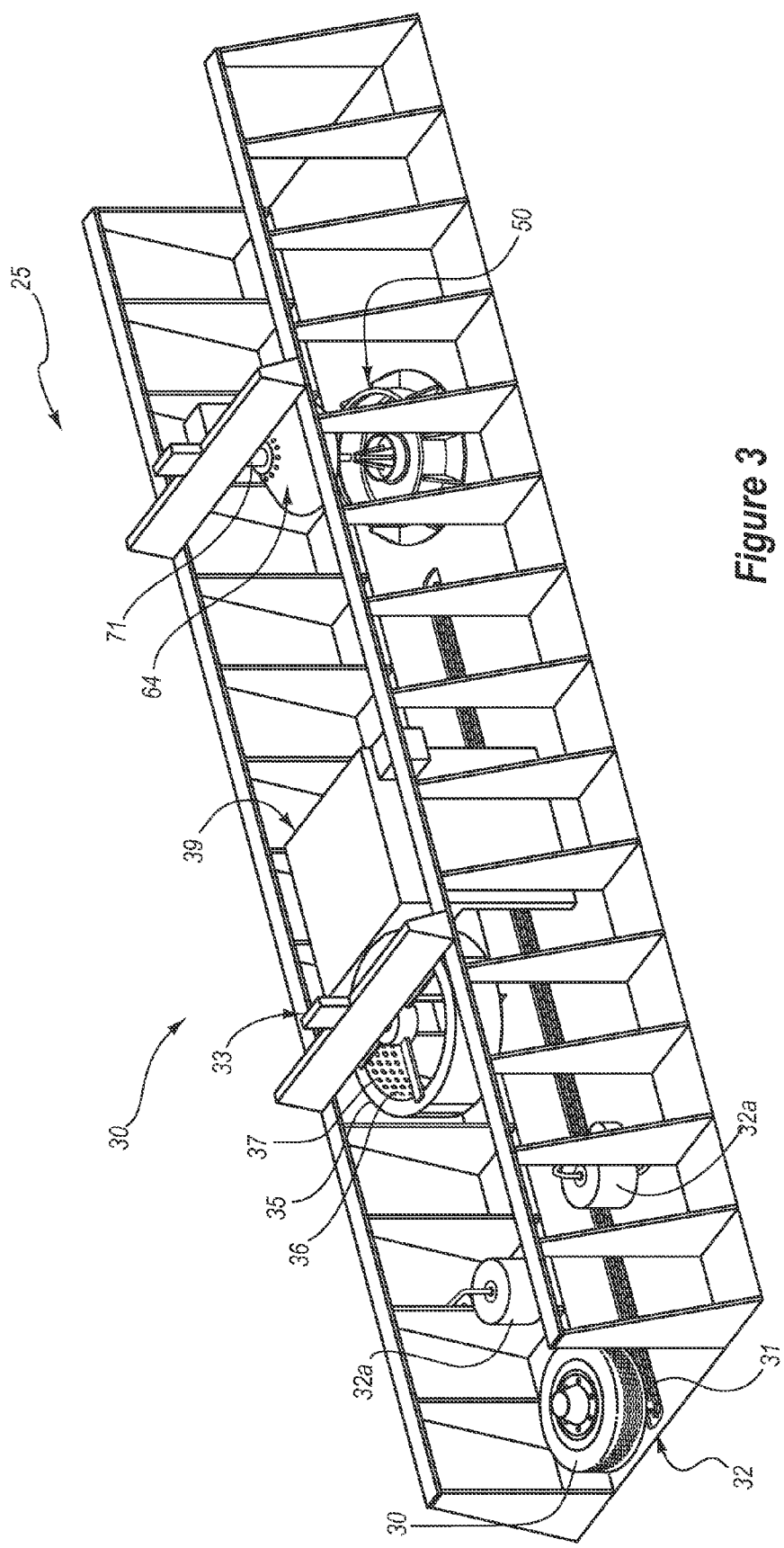
FIG. 3 a top perspective view of a schematic of a tire retreading plant showing stations where the steps of the method of the invention are performed with the apparatus of the invention.

Shown in FIG. 3, from an entry end of the plant 30, the tire carcass 20, mounted to travel on a carriage or trolley that is connected to the continuous moving chain 31, is moved through positioning rollers 32 and into a spray and treatment section 33, shown in the schematics of FIGS. 4 and 4A, wherein the steps of air and spray cleaning of the tire carcass, heating, primer and adhesive coating and heating, shown in blocks 13, 14, 15 and 16 of FIG. 1, are performed. As illustrated in FIG. 3 and in the schematic of FIG. 4, tire carcass 20, traveling on the carriage or trolley on the continuous moving chain 31, is first moved into a spray station 35 wherein a spray of a solvent entrained with air is passed through a cylinder 36, that has a concave inner surface, and into and through individuals spaced nozzles 37 that are fitted in the cylinder inner wall, with each nozzle 37 to direct a spray 38 against the tire carcass tread area 20a and down the tire carcass sides, to scour and thoroughly clean the carcass tread area and down the carcass sides. After drying the tire carcass is moved, as shown in FIG. 3, into a treating and drying area 39, is position in front of and a primer spray bar 40 and is rotated, as shown by arrow A, to coat the tire carcass 20 tread 20a area and down its sides. The tire carcass 20 primer coated tread area 20a surface is allowed to stand until dry for approximately fifteen (15) minutes, and is then moved in front of an adhesive spray bar 42 and is again rotated, shown by arrow A, to coat the tire carcass tire area 20a and down its sides. Which primer and adhesive coating steps are practiced in an area that is vented, shown as a vent hood 43. In practice, a Chemlok® primer and adhesive have been used successfully and are preferred. After application of the Chemlok® adhesive coating, the tire carcass 20 is move into an oven, shown as infrared heaters 43, that heat the tire carcass 20 at a temperature of two hundred twenty five (225) degrees F., for approximately two (2) hours. In practice, it has been determined that the effectiveness of the bond of the polyurethane tread onto the tire carcass tread area is affected by the length of time between when the tire carcass is buffed to remove the old tread and the application of the adhesive layer and therefore these steps should be performed in as short a period of time as is practical. However, after the application and heat curing of the adhesive, the tire carcass can be stored in a clear dry area for up to twenty (20) days.

Figure 4B:
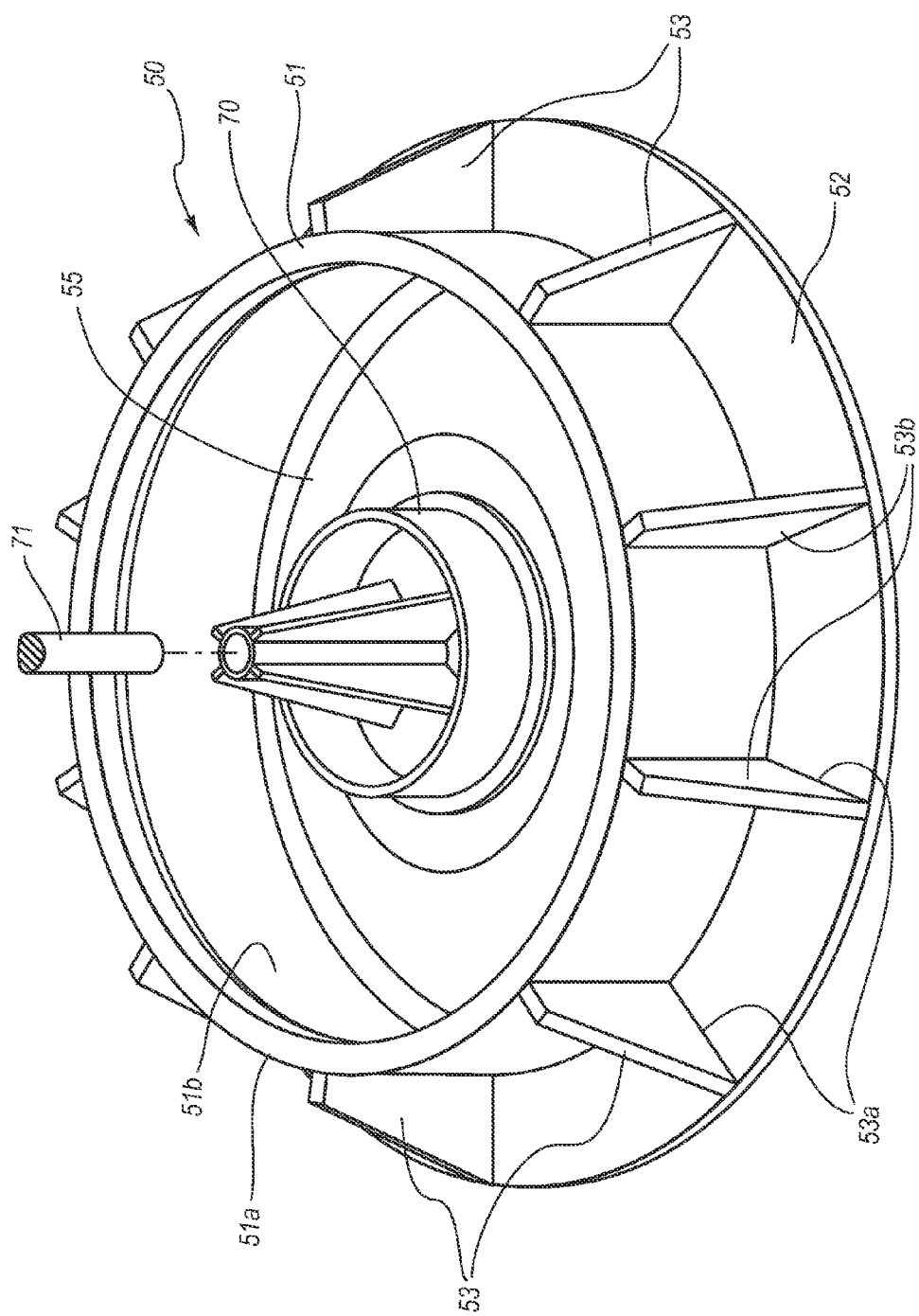
FIG. 4B shows a side elevation view of a tire carcass support base prior to its receiving a ring mounting spaced segments, and showing a section of a shaft fitted through a center thereof.

Immediately after curing or retrieval from a storage area, the tire carcass 20 is ready for re-capping with a polyurethane tread. Shown in FIG. 3, from the treatment and drying area 39, the tire carcass is moved to the mold 50 that, as shown in FIG. 4B, is preferably a cylinder 51, that has an open center area and is secured onto a flat round base 52. Which round base 52 has a diameter that is greater than that of the cylinder 51 to accommodate radial mounting of base legs 53a of right angular brace plates 53, at equal spaced distances around the flat round base edge, and a mounting the vertical legs 53b of the right angle brace plates 53 to the outer surface of the cylinder 51, extending to a top edge 51a thereof. Prior to installing the tire carcass into a mold open center area, a bottom ring 55, shown as a section in FIG. 8, is fitted therein. The bottom ring 55 mounts spaced segments 56 at their bases 56a. Which spaced segments 56 each have a forward edge 57 that will be a mirror image of a recapped tire 80 void or groove 82, as shown in FIG. 9. The bottom ring 55 mounting the spaced segments is installed into the cylinder 51 prior to a fitting the tire carcass therein that includes the pressurized tube fitted therein. Which segments 56 base legs 56a mount, at equal spaced intervals, to the ring 55 surface, to extend upwardly and terminate in sloped end 56b that is adjacent to a center circumference of the cylinder 51 interior wall 51b, providing a gap between the segments 56 and 61, that is filled during the re-capping process and becomes the recapped tire 80 center section 81, as shown in FIG. 9.

The bottom ring 55, shown in FIGS. 4B and 8, additional to the spaced segments 56, includes a lug ring 57 secured to the bottom ring top surface, adjacent to a center opening, that is for engaging and sealing against the bottom side wall of the tire carcass, closing a lower end of the cavity of mold 50, as set out below. Shown in FIGS. 5, 6 and 7, the bottom ring 55 is fitted into the cylinder open area with vertical legs 56c of the spaced segments to contact the cylinder 51 interior surface. Additionally, the bottom ring 55 includes the lug 57 formed as a half ring that extends upwardly from the top surface of the bottom ring 55, proximate to the inner ring edge.

With the bottom ring 55 installed in the mold 50 cavity, a tire carcass having the pressurized tube fitted therein is positioned in the mold, such that the bottom ring 55 lugs, shown in FIG. 7, contact the tire carcass 20 lower side wall. So arranged, with the tire carcass tube pressurized, tire carcass side wall expands against the lug 57, providing a seal against a flow of the polyurethane materials injected into the mold, during re-capping, traveling from the mold cavity.

Figure 5:
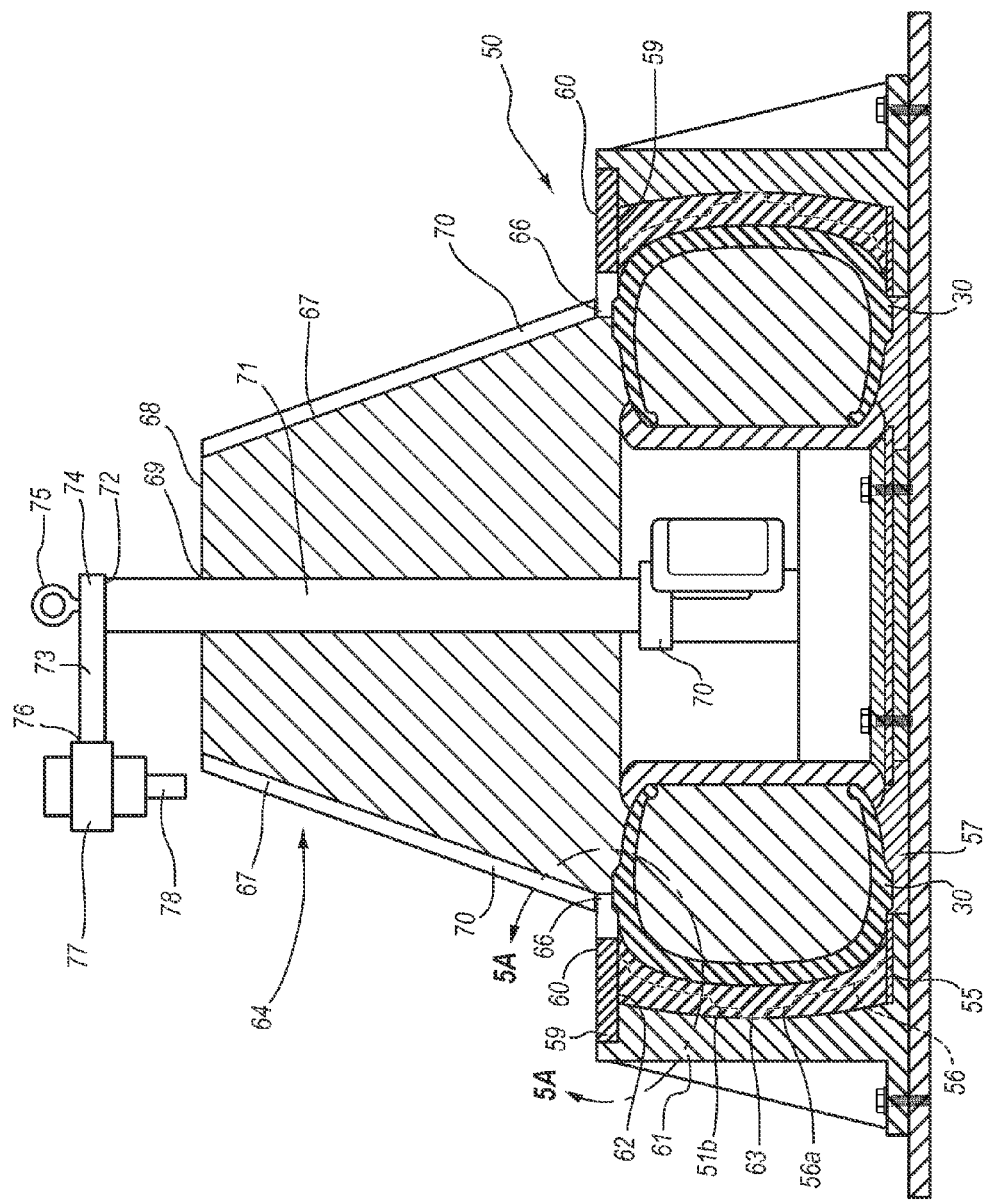
FIG. 5 shows a cross section of the mold of FIG. 4 containing the prepared tire carcass supported on the lower ring mounting the spaced segment and showing the section of shaft of FIG. 4 as a shaft that extends upwardly from the center of the tire support base and passes through a spreader cone that is mounted to, for turning with the mold, and mounts a nozzle on the end of an arm that extends at a right outwardly from the shaft end, positioning a nozzle dispensing opening above the spreader cone upper surface to dispense the mixed polyurethane materials onto the cone that then slide down the cone spreader surface and across its edge to fall into the mold cavity, passing the ends of an upper ring that mounts the spaced segments and filling, from the bottom up, the space between the tire carcass tread area and the mold outer surface.
Figure 6:
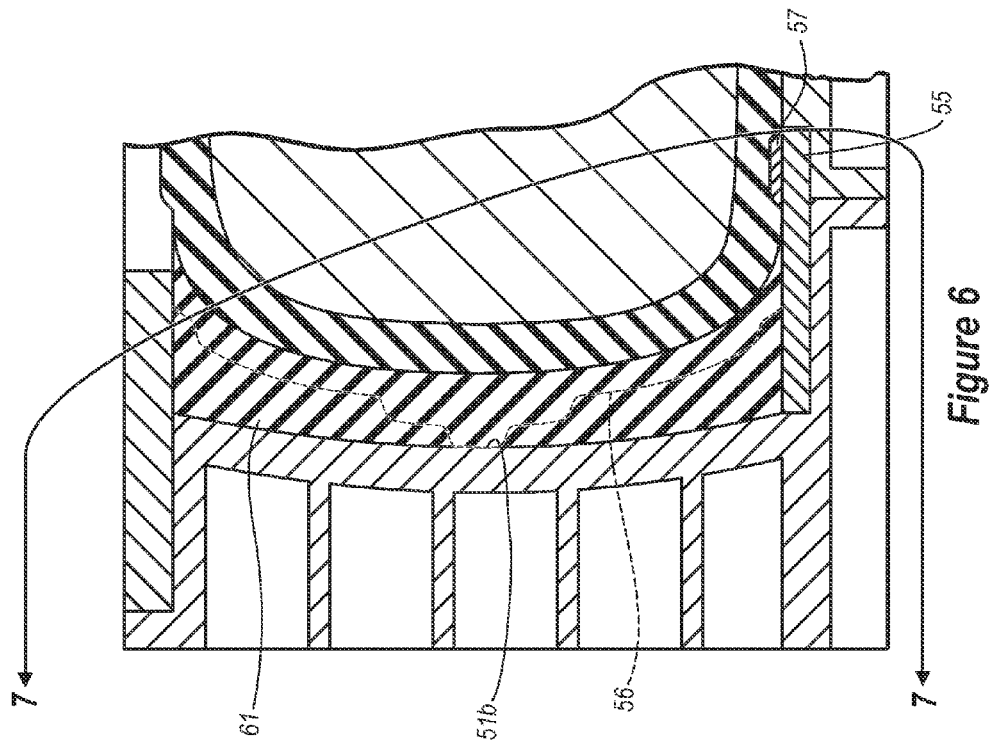
FIG. 6 is an expanded side elevation sectional view of the mold cavity showing the polyurethane materials as having filled the area between the tire carcass tread area and mold wall, showing the spaced segments in broken lines.

Following the fitting of the tire carcass 20 containing a tube into the mold 50 cavity, with the tire carcass lower side wall seated on the continuous lug 57 of the bottom ring 55, a top ring 60 that, as shown in FIGS. 5 and 7, is narrower than bottom ring 55, is fitted onto top 59 of mold 51, and extends inwardly from the cylindrical inner surface 51b of the mold 50. The top ring 60, like the bottom ring 55, is open at its center and mounts spaced segments 61 foot ends 62, with the segment foot end 62 extending beyond its coupling to the top ring 60 center opening edge, to pass a flow of polyurethane materials thereacross Which segments 56 and 61 are identical and, when the top ring 60 is properly fitted to the mold top 59, the space segment end 56b and segment 61 end 63 will be staggered from each other. So arranged, when the polyurethane material is passed into the mold and, after curing and removal of the top ring 60 and attached segments 61, the formed re-capped tire 80, as shown in FIG. 9, will have the center ridge 81 that is the void area between the spaced segments ends 56b and 63, and will have tread voids or grooves 82, shown in FIG. 9, that have the shape of the spaced segments 56 and 61. Where the bottom ring 55 includes a lug 57, shown in FIGS. 5 and 7, that is formed as a half ring around the ring 55 its top surface at the open center edge that engages the tire carcass 20 side wall, below the tread area, the ring 60 does not include a lug for sealing against the tire carcass side wall. Rather, a spreader cone 64, as set out below, includes a lower or bottom edge 66, that when the spreader cone is positioned onto the tire carcass side wall, will be aligned with the lug 57, and is to seal against the tire carcass top side wall surface, prohibiting a flow of the polyurethane materials past that lower edge 66 when the polyurethane materials are passed into the mold cavity.

Shown in FIG. 5 and the enlarged sectional view of FIG. 7, with the top ring 60 mounted onto the mold cylinder 51 top surface 59, and with the tube positioned in the tire carcass inflated to a pressure of approximately nine (9) psi, the tire carcass expands into sealing engagement with the bottom ring 55 lug 57 and the spreader cone 64 lower edge 66, isolating the tire carcass 20 tread area between the lug 57 and lower edge 66 that contain a flow of polyurethane materials directed between the cone 64 bottom edge 66, along the 61 segments, that fills the cavity of mold 50 cylinder 51 during the molding step, as illustrated by block 17 of FIG. 1.

Shown in the sectional view of FIG. 5, the spreader cone 64 has a truncated cone shaped outer surface 67 that terminates in the lower edge 66 that may have a square or half ring shape, and the spreader cone 64 includes a disk secured across its top 68 that has a center hole 69. The center hole 69 has a diameter to allow passage of a shaft 71 that extends axially upwardly from a center of hub 70, shown in FIGS. 4B and 5, of mold 50. Shown in FIG. 5, shaft 71 includes a top end 72 that mounts an end 74 of an arm 73, as by an eye bolt 75, and which arm 73 includes a pouring head 77 secured to its opposite end 76. Preferably, the pouring head 77 is maintained in a fixed compass attitude in relation to the mold 50 and spreader cone 64 that are, in practice, turned together at a low speed, as the pouring head 77 dispenses the polyurethane material through a nozzle end 78 thereof.

Figure 5A:
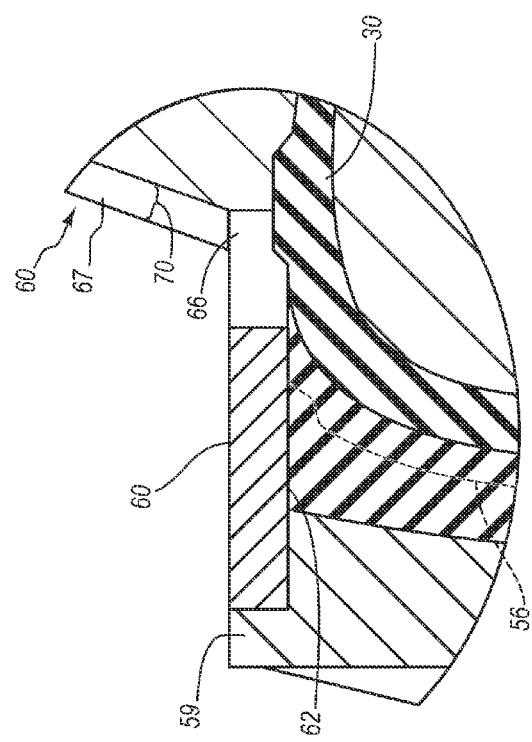
FIG. 5A is an enlarged sectional view taken within the line 5A-5A of FIG. 5, showing a top ring mounting the spaced segments that are shown in broken lines, fitted to the mold, showing a gap between the spreader cone edge to pass a flow of the polyurethane materials off from the spreader cone lower edge and into the mold cavity, recapping the tire carcass.

As illustrated in the schematic of FIG. 3, and in FIG. 5 and 5A, with the spreader cone 64 center hole 69 fitted onto, to pass along the shaft 71 to where the cone bottom edge 66 is properly positioned on the tire carcass side, and aligns with the lug 57, the tire carcass side walls are sealed against passage of the flow polyurethane material. So arranged, the polyurethane materials can be poured from the fixed nozzle end 78 to flow, as a sheet, down the spreader cone 64 outer surface 67, as the spreader cone 64 and mold 50 are turned together, at low speed. It should, however, be understood that, with an alteration to the described structure, the pouring head could be arranged to turn over the spreader cone surface, with the cone and mold fixed in place, within the scope of this disclosure.

The spreader cone 64 surface 67 is formed from a selected material and has a slope relative to the vertical to encourage the continuous flow of polyurethane materials as it is passed from the nozzle 78 to spread into a sheet that slides smoothly down the cone outer surface 67, and off the spreader cone edge 66 as a continuous sheet that travels across the tire carcass buffed tread area to the tire carcass lower side wall, and is contained at the lug 57. So arranged, the sheet of polyurethane material travels across the lower ring 55 to the mold wall 51b, filling the mold cavity from the bottom up. In which filling, air as is present in the mold cavity is forced upwardly, venting out of the mold opening between the top ring opening edge and the spreader cone 64 bottom edge 66, eliminating air from the mold as the mold cavity is filled, providing a homogeneous tire carcass re-cap.

In practice, the polyurethane material constituents are combined together at, and are, passed through the nozzle 78. Which polyurethane material constituents are selected to have a viscosity to spread out and flow as a sheet down over the cone 64 surface 67, to slide down the cone surface 67. To promote which sheeting and even travel as a sheet down the surface 67, the spreader cone 64 is manufactured to have a smooth surface that the preferred polyurethane materials will not adhere to. In practice, a spreader cone 64 fabricated from stainless steel, or one whose outer surface is coated with Teflon®, or a like material, will provide the required non stick surface. Though, it should be understood, the spreader cone 64 may be fabricated from or coated with any appropriate material, within the scope of this disclosure.

After curing for approximately fifteen (15) minutes, as illustrated as step 18 of FIG. 1, the recapped tire 80, shown in FIG. 8, is ready for removal from the mold 50. In that removal process, the housing head 77, arm 73, shaft 71 and spreader cone 64 are removed, exposing the finished re-capped tire 80. Prior to which re-capped tire 80 removal, the top ring 60 with spaced segments 61 secured thereto are lifted out of the mold cylinder 51 cavity, freeing the re-capped tire that can then be lifted out of the mold cylinder 51 and transferred to a post curing location where the removed re-capped tire 80, as shown in FIG. 9, is further cured for approximately twenty four (24) hours at room temperature. Or, if it is required to speed up the post curing process, the re-capped tire 80 can be post cured for approximately twelve (12) hours at a temperature of approximately one hundred seventy five (175) degrees F., completing the re-capping process.

While a preferred embodiment of our invention in a process and method for re-capping a tire carcass, that can be for use on even a large earth vehicle, with a polyurethane material, in a single molding operation, have been shown and described herein, it should be understood that variations and changes are possible to the method for the formation of the described tire core, and apparatus to form the tire core, and the materials used, without departing from the subject matter coming within the scope of the following claims, and a reasonable equivalency thereof, which claims we regard as our invention.

We claim:

1. A method for recapping a tire carcass with a polyurethane tread comprising the steps of, inspecting the tire carcass for suitability for recapping; cleaning said tire carcass and re-inspecting it for suitability for recapping; removing a tread of said tire carcass above a belt of said tire carcass and again inspecting the tire carcass for suitability for recapping; first coating a prepared tread area of said tire carcass with a primer that is allowed to dry and then applying an adhesive to said prepared tread area, where said primer and adhesive are selected to be compatible and, when cured together for approximately two (2) hours at a temperature of approximately two hundred twenty five (225) degrees F., will permanently bond said tire carcass tread area to a mixture of selected polyurethane material constituents directed into a mold containing said tire carcass; said mold is cylindrical, has a center cavity to receive said tire carcass and is open adjacent to a side of said tire carcass, to receive said tire carcass between bottom and top rings that each include opposing equal spaced segments that extend across said tire carcass prepared tread area to provide a retreaded portion of the tire with spaced grooves separated by a center ridge; and positioning a spreader cone having a lower end edge that is positioned onto said tire carcass side wall, adjacent to the tire prepared tread area, and turning said spreader cone and said mold together, with an outer surface of said spreader cone sloped such that a flow of polyurethane materials passed from a nozzle will form and flow as a sheet down said spreader cone outer surface and across said spreader cone edge into said mold cavity, to travel across said tire carcass tread area and fill said mold cavity from bottom to top, forcing air from said mold cavity ahead of said flow of polyurethane materials, providing a recapped tread to said tire carcass tread area.

2. The method for recapping a tire carcass with a polyurethane tread as recited in claim 1, further including allowing the primer coating to dry for approximately fifteen (15) minutes prior to the application of the adhesive.

3. The method for recapping a tire carcass with a polyurethane tread as recited in claim 1, further including, prior to and after positioning the tire carcass in the mold, the mold is heated to, and maintained at, a temperature of approximately one hundred eighty (180) degrees F.

4. The method for recapping a tire carcass with a polyurethane tread as recited in claim 3, further including fitting a tube in the tire carcass prior to its installation in the mold cavity and pressurizing said tube to a pressure of approximately nine (9) psi.

5. The method for recapping a tire carcass with a polyurethane tread as recited in claim 4, further including rotating the mold and spreader cone at an RPM that is appropriate to provide a sheeting action to a measured amount of the selected polyurethane materials poured onto the spreader cone to just fill the mold cavity formed around the tire carcass prepared tread area.

6. The method for recapping a tire carcass with a polyurethane tread as recited in claim 5, further including, after the pour of polyurethane materials have cooled for approximately fifteen (15) minutes, the mold is opened to remove the recapped tire carcass.

7. The method for recapping a tire carcass with a polyurethane tread as recited in claim 6, further including, removing the recapped tire carcass from the mold and moving it to a post curing area for curing at room temperature for twenty four (24) hours.

8. The method for recapping a tire carcass with a polyurethane tread as recited in claim 6, further including, removing the recapped tire carcass from the mold and moving it to a post curing area for curing at a temperature of one hundred seventy five (175) degrees F., for twelve (12) hours.

* * * * *